(12) United States Patent
Tanaka

(10) Patent No.: US 11,305,628 B2
(45) Date of Patent: Apr. 19, 2022

(54) ELECTRIC VEHICLE

(71) Applicant: TOYOTA JIDOSHA KABUSHIKI KAISHA, Aichi-ken (JP)

(72) Inventor: Hiromasa Tanaka, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 71 days.

(21) Appl. No.: 16/856,039

(22) Filed: Apr. 23, 2020

(65) Prior Publication Data

US 2020/0338975 A1  Oct. 29, 2020

(30) Foreign Application Priority Data

Apr. 25, 2019  (JP) .............................. JP2019-083910

(51) Int. Cl.
*B60K 1/04* (2019.01)

(52) U.S. Cl.
CPC ........ *B60K 1/04* (2013.01); *B60K 2001/0411* (2013.01)

(58) Field of Classification Search
CPC ... B60K 2001/0411; B60L 50/71; B60L 50/72
See application file for complete search history.

(56) References Cited

U.S. PATENT DOCUMENTS

| 10,205,316 | B1* | 2/2019 | Jojima | ..................... B60L 50/51 |
| 2004/0090085 | A1* | 5/2004 | Kawasaki | ............... B60L 50/71 296/187.09 |
| 2010/0112412 | A1* | 5/2010 | Aoto | ....................... B60L 50/71 429/515 |
| 2012/0021301 | A1* | 1/2012 | Ohashi | ............... B62D 25/2072 429/400 |
| 2014/0234744 | A1* | 8/2014 | Nielsen | ............... H01M 8/2475 429/457 |
| 2015/0021114 | A1* | 1/2015 | Hotta | .................... B60L 3/0069 180/279 |
| 2015/0027796 | A1* | 1/2015 | Naito | ..................... B60L 1/003 180/65.31 |
| 2016/0039308 | A1* | 2/2016 | Fushimi | ................... B60K 1/04 180/65.31 |
| 2016/0207386 | A1* | 7/2016 | Nagaosa | ................. B60L 50/71 |
| 2016/0207387 | A1* | 7/2016 | Itoga | ....................... B60L 50/71 |
| 2016/0297290 | A1* | 10/2016 | Murata | .................. B60L 58/30 |
| 2017/0096067 | A1* | 4/2017 | Murata | .................... B60K 1/00 |
| 2017/0101031 | A1* | 4/2017 | Ohashi | ................... B60L 50/72 |
| 2017/0117570 | A1* | 4/2017 | Ishikawa | ............. H01M 8/2475 |

(Continued)

FOREIGN PATENT DOCUMENTS

| DE | 102020124027 A1 * | 3/2021 | ............. B62D 21/11 |
| JP | 2012-144142 A | 8/2012 | |
| JP | 2018-131018 A | 8/2018 | |

*Primary Examiner* — Jeffrey J Restifo
(74) *Attorney, Agent, or Firm* — Hauptman Ham, LLP

(57) ABSTRACT

An electric vehicle includes a fuel cell unit and a power controller unit that are disposed next to each other in a front compartment. Each of the fuel cell unit and the power controller unit includes an upper casing having a lower strength and a lower casing having a strength greater than that of the upper casing. The fuel cell unit and the power controller unit are arranged so that a distance La between the lower casings along an alignment axis is shorter than a distance Lb between the upper casings along the alignment axis.

10 Claims, 3 Drawing Sheets

(56) References Cited

U.S. PATENT DOCUMENTS

| | | | |
|---|---|---|---|
| 2018/0134178 A1* | 5/2018 | Katayama | B60L 3/0053 |
| 2018/0178641 A1* | 6/2018 | Yamafuji | B60K 1/04 |
| 2018/0229771 A1* | 8/2018 | Sekine | B62D 21/152 |
| 2018/0297461 A1* | 10/2018 | Tambo | B60L 3/0007 |
| 2018/0304767 A1* | 10/2018 | Ichida | B60L 50/71 |
| 2019/0193547 A1* | 6/2019 | Ichida | H01M 8/2475 |
| 2019/0214668 A1* | 7/2019 | Aisima | B60L 50/72 |
| 2020/0161672 A1* | 5/2020 | Ichida | B60L 3/0007 |
| 2020/0161692 A1* | 5/2020 | Yoshitomi | H01M 8/2475 |
| 2020/0338975 A1* | 10/2020 | Tanaka | B60K 1/04 |
| 2021/0005908 A1* | 1/2021 | Yoshitomi | B60L 3/0007 |
| 2021/0143453 A1* | 5/2021 | Yoshitomi | H01M 8/04164 |

* cited by examiner

ELECTRIC VEHICLE

CROSS REFERENCE TO RELATED APPLICATION

This application claims priority to Japanese Patent Application No. 2019-083910 filed on Apr. 25, 2019, which is incorporated herein by reference in its entirety including the specification, claims, drawings, and abstract.

TECHNICAL FIELD

The present disclosure relates to a structure of an electric vehicle that includes two or more high-voltage units in a front compartment.

BACKGROUND

In recent years, electric vehicles, such as electric automobiles, which are driven by a motor are used. In an electric vehicle, a front compartment at the front of the vehicle encloses high voltage units, such as an inverter, a DC-to-DC converter, an electric power controller including these devices, and a fuel cell unit (refer to, for example, JP 2012-144142A and JP 2018-131018A).

In an electric vehicle having such a configuration, the high voltage units may be moved to come into contact with each other to be damaged in the case of a collision. Thus, JP 2012-144142A and JP 2018-131018A propose structures that would prevent the high voltage units from hitting each other in the case of a collision. However, because collisions may occur in a variety of manners, in the conventional structures disclosed in JP 2012-144142A and JP 2018-131018A, the high voltage units may still come into contact with each other.

SUMMARY

An object of the present disclosure is to reduce damage of high voltage units even when the high voltage units come into contact with each other in the case of a collision An electric vehicle according to one aspect of the present disclosure includes two or more high voltage units disposed next to each other in a front compartment, when viewed from above the electric vehicle. Each of the high voltage units includes a lower strength portion disposed at either one of an upper side and a lower side of the high voltage unit, and a higher strength portion disposed at the other one of the upper side and the lower side of the high voltage unit. The higher strength portion has a strength higher than that of the lower strength portion. The high voltage units are arranged such that a distance between the higher strength portions of the adjacent high voltage units along an alignment axis along which the adjacent high voltage units are disposed next to each other is shorter than a distance between the lower strength portions of the adjacent high voltage units along the alignment axis.

In this way, when one of the high voltage units moves toward another high voltage unit, the higher strength portions of the high voltage units come into contact with each other before the lower strength portions come into contact with each other. Thus, it becomes possible to inhibit the distance between the high voltage units along the alignment axis from getting shorter. Accordingly, damage of the lower strength portions that would be caused by contact between the lower strength portions can be reduced. Furthermore, because the contact between the high strength portions is acceptable, the electric vehicle can have a compact size by minimizing the distance between the high voltage units.

In an electric vehicle according to another aspect of the present disclosure, each of the higher strength portions of the high voltage units may be disposed at the lower side of the high voltage unit.

Each of the high voltage units can be stably supported by configuring the lower side of the high voltage unit that supports the load of the high voltage unit as the higher strength portion.

In an electric vehicle according to yet another aspect of the present disclosure, a casing of each of the higher strength portions of the high voltage units may have a wall thickness greater than that of a casing of each of the lower strength portions of the high voltage units.

The higher strength portions can be structured by simply thickening the wall.

In an electric vehicle according to yet another aspect of the present disclosure, the casing of the higher strength portion of at least one of the adjacent high voltage units may include a raised portion on a surface that faces the higher strength portion of the other one of the adjacent high voltage units. The raised portion may protrude toward the higher strength portion of the other one of the high voltage units. The adjacent high voltage units may be arranged such that a distance along the alignment axis between an outer end of the raised portion and the other one of the high voltage units or between the outer ends of the raised portions is shorter than a distance between the lower strength portions along the alignment axis.

This structure can effectively inhibit contact between the lower strength portions because when one of the high voltage units moves along the alignment axis toward the other one of the adjacent high voltage units, the raised portion on the higher strength portion of the one of the adjacent high voltage units comes into contact with the higher strength portion of the other one of the adjacent high voltage units.

In an electric vehicle according to yet another aspect of the present disclosure, the raised portion may be a rib that protrudes from a surface of the casing of the higher strength portion of the one of the adjacent high voltage units. The surface from which the rib protrudes may face the higher strength portion of the other one of the adjacent high voltage units such that the rib extends along a transverse or longitudinal axis of the one of the adjacent high voltage units. The raised portion may be a portion of a coupling flange of the casing of the higher strength portion of the one of the adjacent high voltage units. The coupling flange is fixed to the lower strength portion of the one of the adjacent high voltage units. The portion of the coupling flange faces the high strength portion of the other one of the adjacent high voltage units.

The above described structures can achieve a raised portion by a simple structure.

In an electric vehicle according to yet another aspect of the present disclosure, the two or more high voltage units may include a fuel cell unit and a power control unit that controls electric power supplied from the fuel cell unit to a vehicle driving motor that is powered by the electric power supplied from the fuel cell unit.

Because the contact between the higher strength portion of the fuel cell unit and the higher strength portion of the power control unit in the case of a collision is acceptable, the electric vehicle can have a compact size by arranging the fuel cell unit and the power controller unit next to each other within a minimized distance in the front compartment.

According to the present disclosure, damage of the high voltage units can be reduced even when the high voltage units come into contact with each other in the case of a collision.

BRIEF DESCRIPTION OF DRAWINGS

Embodiments of the present disclosure will be described based on the following figures, wherein.

DESCRIPTION OF EMBODIMENTS

Figure 1:
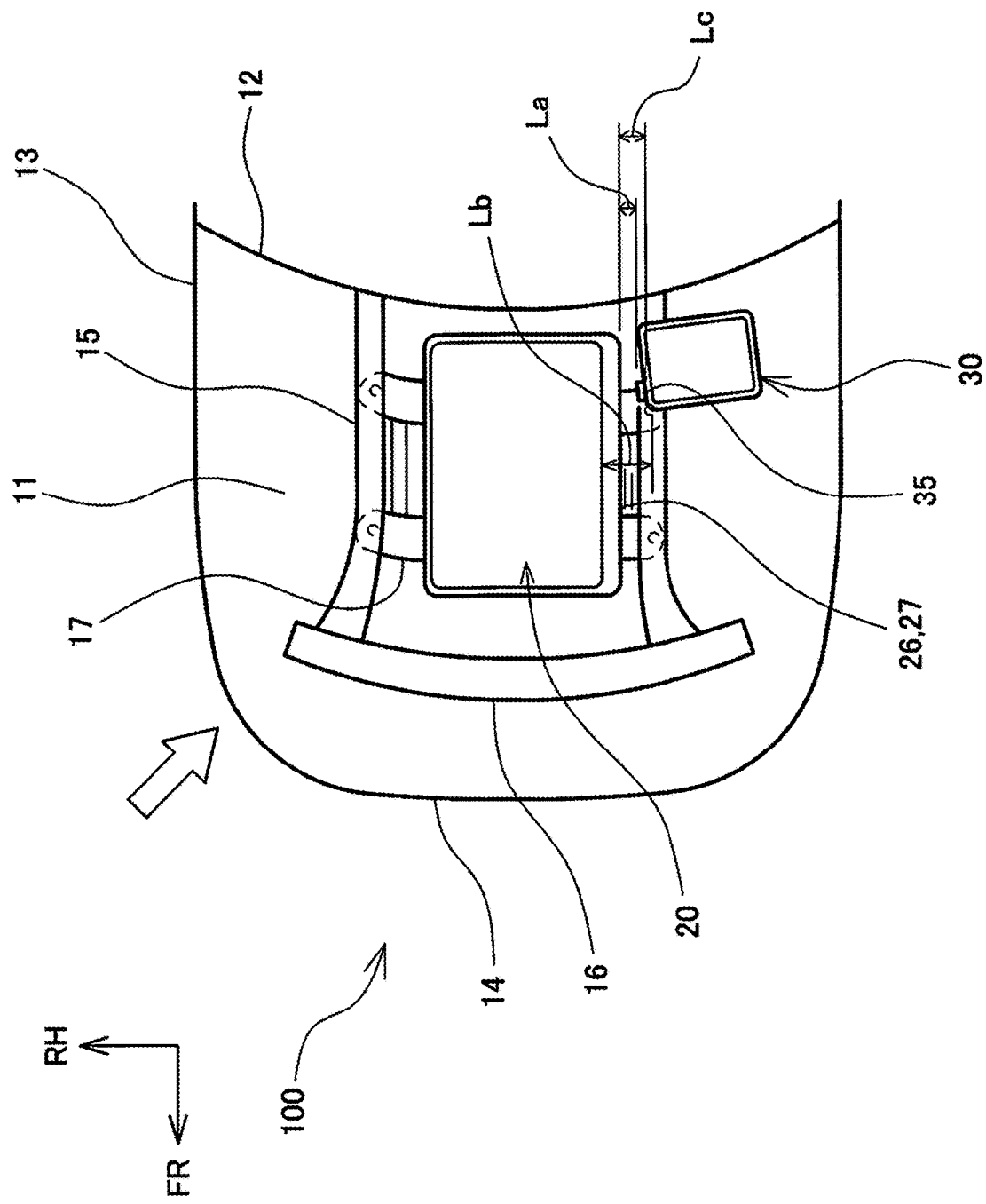
FIG. 1 is a plan view of a front compartment of an electric vehicle according to an embodiment of the present disclosure, viewed from above the vehicle.

An electric vehicle 100 according to an embodiment of the present disclosure is described below with reference to the drawings. In the drawings, arrows FR, UP, and RH represent directions toward the front (forward direction), up, and right of the electric vehicle 100, respectively. The reverse directions of the respective arrows FR, UP, and RH are directions toward the rear, down, and left of the electric vehicle 100 respectively. In description below, unless otherwise specified, when directions are described simply using the front, rear, right, left, up, down, or other directional terms, these directions refer to the front and rear of the vehicle along the longitudinal axis, right and left of the vehicle along the transverse axis (vehicle width direction), or up and down of the vehicle along the vertical axis.

As shown in FIG. 1, a front compartment 11 is disposed at the front of the electric vehicle 100. The front compartment 11 is a space partitioned at the front and back, and the right and left with a dashboard 12 disposed at the front of a passenger compartment, front fenders 13 on respective sides at a front portion of the vehicle, and a front grill 14 at the front end of the vehicle. Inside the front compartment 11, there are provided right and left front side members 15 that extend along the longitudinal axis of the vehicle and a bumper reinforcement 16 that extends along the transverse axis of the vehicle, connecting the front ends of the right and left front side members 15.

A fuel cell unit 20, one of the high voltage units, is attached to the right and left front side members 15 via a front suspension member 17. A power controller unit 30, another high voltage unit, is mounted on the left side of the fuel cell unit 20.

The fuel cell unit 20 includes stacked multiple fuel cells to output high voltage electric power by reacting air and hydrogen. The fuel cell unit 20 is oriented such that the fuel cells are stacked along the longitudinal axis of the vehicle. The power controller unit 30 may include an inverter, a DC-to-DC converter, and/or other devices. The power controller unit 30 controls electric power supplied from the fuel cell unit 20 to a vehicle drive motor. The fuel cell unit 20 and the power controller unit 30 are disposed next to each other along the transverse axis of the vehicle in the front compartment 11, when viewed from above the vehicle.

Figure 2:
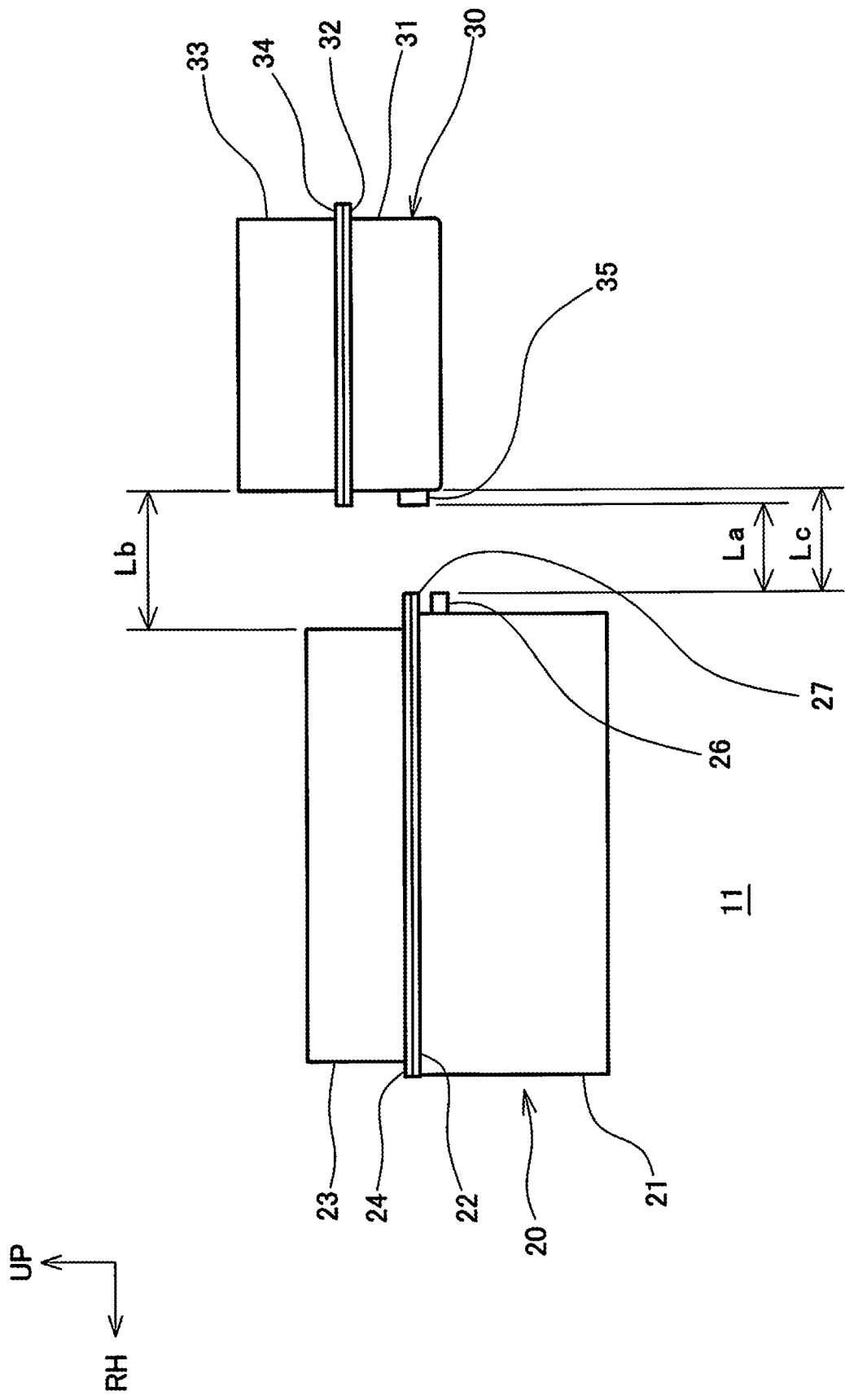
FIG. 2 is an elevational view of a fuel cell unit and a power controller unit disposed in the front compartment of the electric vehicle according to an embodiment of the present disclosure, viewed from the front of the vehicle.

As shown in FIG. 2, the fuel cell unit 20 includes a lower casing 21 that encloses the fuel cells, and an upper casing 23 that encloses a controller for controlling the fuel cells or other devices. Coupling flanges (also referred to as raised portions) 22, 24 that connect the lower casing 21 and the upper casing 23 are provided respectively at the upper end of the lower casing 21 and the lower end of the upper casing 23. The coupling flanges 22, 24 are coupled to each other with bolts (not shown).

The lower casing 21 has a wall thickness greater than that of the upper casing 23 so that the lower casing 21 has a strengthen higher than that of the upper casing 23. In this way, the lower casing 21 having a higher strength and the high voltage unit, such as a fuel cell, enclosed in the lower casing 21 are configured as a higher strength portion of the fuel cell unit 20. In contrast, the upper casing 23 having a lower strength and the high voltage unit, such as a controller, enclosed in the upper casing 23 are configured as a lower strength portion of the fuel cell unit 20. In short, the lower casing 21 is a casing of the higher strength portion of the fuel cell unit 20, whereas the upper casing 23 is a casing of the lower strength portion of the fuel cell unit 20. The lower casing 21 and the upper casing 23 are made of metal, such as die-cast aluminum.

Similarly to the fuel cell unit 20, the power controller unit 30 includes a lower casing 31 that encloses an inverter and an upper casing 33 that encloses a DC-to-DC converter or other devices. Coupling flanges (also referred to as raised portions) 32, 34 that connect the lower casing 31 and the upper casing 33 are provided respectively at the upper end of the lower casing 31 and the lower end of the upper casing 33. The coupling flanges 32, 34 are coupled to each other with bolts (not shown).

The lower casing 31 has a wall thickness greater than that of the upper casing 33 so that the lower casing 31 has a strengthen higher than that of the upper casing 33. In this way, the lower casing 31 having a higher strength and the high voltage unit, such as an inverter, enclosed in the lower casing 31 are configured as a higher strength portion of the power controller unit 30. In contrast, the upper casing 33 having a lower strength and the high voltage unit, such as a DC-to-DC converter, enclosed in the upper casing 33 are configured as a lower strength portion of the power controller unit 30. In short, the lower casing 31 is a casing of the higher strength portion of the power controller unit 30, whereas the upper casing 33 is a casing of the lower strength portion of the power controller unit 30. The lower casing 31 and the upper casing 33 are made of metal, such as die-cast aluminum.

The lower casing 21 of the fuel cell unit 20 includes, on a surface facing the lower casing 31 of the power controller unit 30, a rib 26 (also referred to as a raised portion) that protrudes toward the power controller unit 30. As shown in FIG. 1, the rib 26 is a narrow board member that extends along the longitudinal axis of the vehicle on the left surface of the lower casing 21 that faces the power controller unit 30. A left coupling flange portion 27 of the coupling flange 22 of the lower casing 21 protrudes further than the other portions of the coupling flange 22 such that the left coupling flange portion 27 protrudes toward the power controller unit 30 to the same distance as the rib 26.

The lower casing 31 of the power controller unit 30 includes, on the right surface facing the lower casing 21 of the fuel cell unit 20, a metal pedestal portion 35 (also referred to as a raised portion) that protrudes toward the fuel cell unit 20.

As shown in FIGS. 1 and 2, a distance La along the transverse axis of the vehicle, which is an alignment axis along which the fuel cell unit 20 and the power controller unit 30 are disposed next to each other, between the outer end (outer edge) of the rib 26 or the coupling flange portion 27 of the fuel cell unit 20 and the outer end of the pedestal portion 35 of the power controller unit 30 is shorter than a distance Lb along the transverse axis of the vehicle between the upper casing 23 of the fuel cell unit 20 and the upper casing 33 of the power controller unit 30 (La<Lb). A distance Lc between the outer end of the rib 26 or the coupling flange portion 27 of the fuel cell unit 20 and the lower casing 31 of the power controller unit 30 is also shorter than the distance Lb (Lc<Lb).

Figure 3:
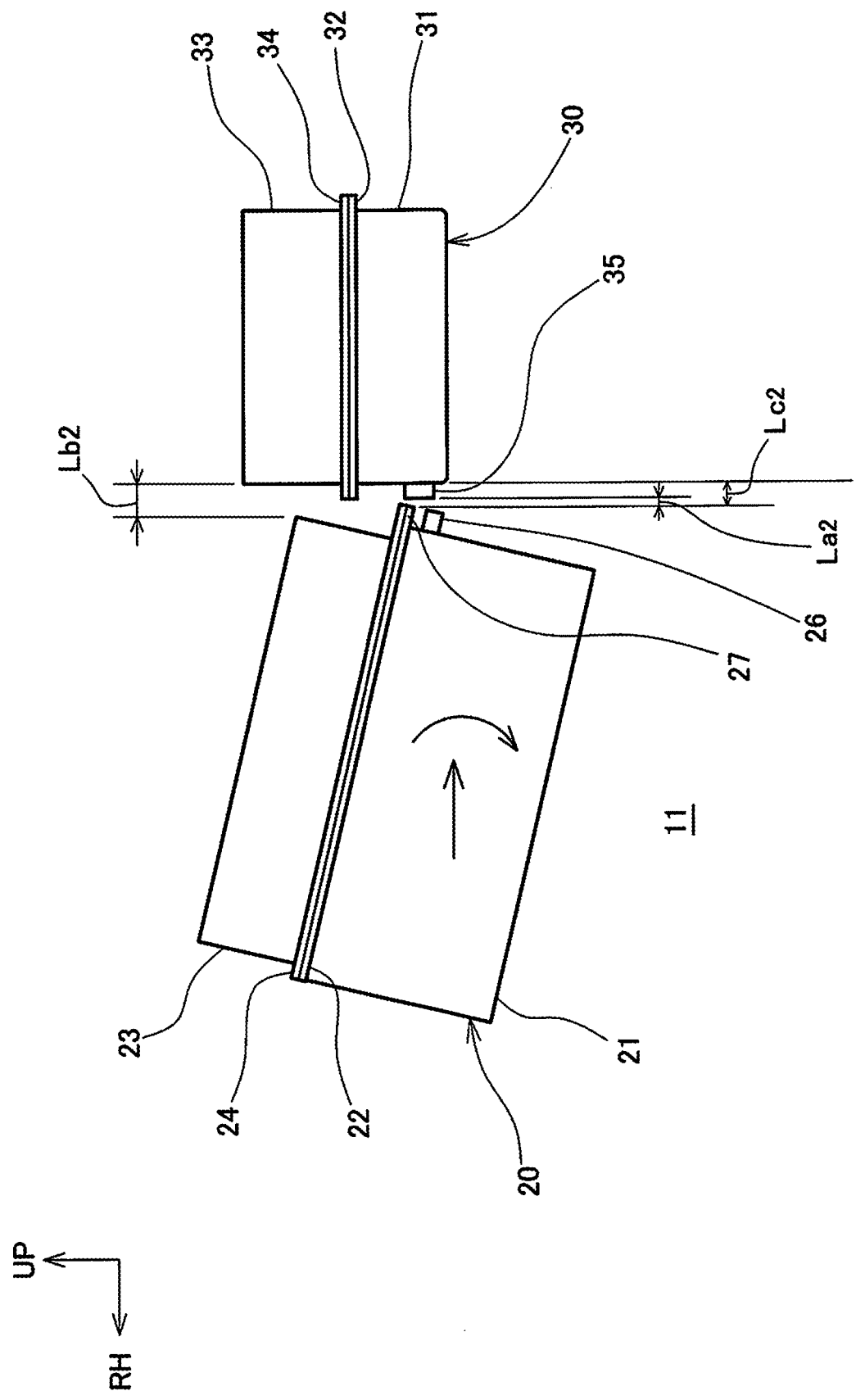
FIG. 3 is an elevational view in which the fuel cell unit shown in FIG. 2 has been moved toward the power controller unit due to a collision, viewed from the front of the vehicle.

With reference to FIG. 3, the movement of the fuel cell unit 20 in the case of a right front oblique collision of the electric vehicle 100 having the above described structure is described below. In this case, as shown with the white arrow in FIG. 1, an impact load acts toward the rear left of the vehicle.

As shown in FIG. 3, the impact load moves the fuel cell unit 20 leftward. Due to this collision, the right front side member 15 is deformed upwards such that the right side of the fuel cell unit 20 on the right front side member 15 is also raised. In this way, as shown in FIG. 3, the right side of the fuel cell unit 20 is raised, and the fuel cell unit 20 moves leftward while the fuel cell unit 20 rotates clockwise. In other words, the fuel cell unit 20 moves toward the power controller unit 30 along the transverse axis of the vehicle (the alignment axis) while the fuel cell unit 20 rotates with the right side being raised.

Then, the distances La, Lb, and Lc become shorter respectively to La2, Lb2, and Lc2. When the shortest distance La2 becomes zero, the outer ends of the rib 26 and the coupling flange portion 27 of the lower casing 21 of the fuel cell unit 20 come into contact with the outer end of the pedestal portion 35 of the lower casing 31 of the power controller unit 30. This contact inhibits, from getting shorter, the distance Lb2 along the alignment axis between the upper casing 23 of the fuel cell unit 20 and the upper casing 33 of the power controller unit 30. In this way, damage of the upper casing 23 of the fuel cell unit 20 and the upper casing 33 of the power controller unit 30, both having a lower strength, that would be caused by contact between these two can be inhibited.

Furthermore, because the contact between the lower casings 21 and 31, both having a higher strength, in the case of a collision is acceptable, the electric vehicle 100 can have a compact size by minimizing the distance between the fuel cell unit 20 and the power controller unit 30 along the transverse axis of the vehicle.

The distance Lc is shorter than the distance Lb. The distance Lc2 is also shorter than the distance Lb2. Accordingly, even when the outer ends of the rib 26 and the coupling flange portion 27 do not come into contact with the outer end of the pedestal portion 35 depending on the type of the collision, or even when no pedestal portion 35 is provided, the outer ends of the rib 26 and the coupling flange portion 27 come into contact first with a side surface of the lower casing 31 of the power controller unit 30. This contact inhibits, from getting shorter, the distance Lb2 between the upper casing 23 of the fuel cell unit 20 and the upper casing 33 of the power controller unit 30 along the alignment axis. In this way, damage of the upper casing 23 of the fuel cell unit 20 and the upper casing 33 of the power controller unit 30, both having a lower strength, that would be caused when these two come into contact with each other can be inhibited.

Although, in the electric vehicle 100 according to the above embodiments of the present disclosure, the fuel cell unit 20 and the power controller unit 30 are described to be disposed next to each other along the transverse axis of the vehicle, the present disclosure is not limited to these embodiments. The fuel cell unit 20 and the power controller unit 30 may be disposed along the longitudinal axis of the vehicle. In this case, the rib 26 and the coupling flange portion 27 are oriented to extend along the transverse axis of the vehicle. When the fuel cell unit 20 moves rearward in the case of a front collision of a vehicle, because the outer ends of the rib 26 and the coupling flange portion 27 of the lower casing 21 come into contact with the lower casing 31 of the power controller unit 30, the damage of the upper casing 23 of the fuel cell unit 20 and the upper casing 33 of the power controller unit 30, both having a lower strength, that would be caused when these two come into contact with each other can be inhibited.

Although, in the electric vehicle 100 according to the above embodiments of the present disclosure, the fuel cell unit 20 and the power controller unit 30 are described as the two high voltage units that are disposed next to each other in the front compartment 11, other high voltage units, such as a battery unit, may be disposed next to each other along the transverse or longitudinal axis of the vehicle. In this case, the two or more high voltage units may be disposed such that a distance between the higher strength portions of the adjacent high voltage units along the alignment axis is shorter than a distance between the lower strength portions of these units along the alignment axis.

Although, in the electric vehicle 100 according to the embodiments of the present disclosure, the lower casings 21 and 31 are described to have a strength higher than that of the upper casings 23 and 33, the present disclosure is not limited to such embodiments. The upper casings 23 and 33 may have a strength higher than that of the lower casings 21 and 31, and raised portions, such as the rib 26 and the pedestal portion 35, may be disposed on the upper casings 23 and 33. In this case, the upper casings 23 and 33, having a higher strength, come into contact via the rib 26 and/or the pedestal portion 35. In this way, because the contact between the lower casings 21 and 31, both having a lower strength, can be inhibited, the damage of the lower casings 21 and 31 can be reduced.

The invention claimed is:

1. An electric vehicle comprising:
   a plurality of high voltage units disposed next to each other in a front compartment, when viewed from above the electric vehicle, each of the plurality of high voltage units comprising
   a lower strength portion disposed at either one of an upper side and a lower side of the high voltage unit, and
   a higher strength portion disposed at the other one of the upper side and the lower side of the high voltage unit, the higher strength portion having a strength higher than that of the lower strength portion,
   wherein the plurality of high voltage units are arranged such that a distance between the higher strength portions of the adjacent high voltage units along an alignment axis along which the adjacent high voltage units are disposed next to each other is shorter than a distance between the lower strength portions of the adjacent high voltage units along the alignment axis,
   a casing of each of the higher strength portions of the high voltage units has a wall thickness greater than that of a casing of each of the lower strength portions of the high voltage units,
   the casing of the higher strength portion of at least one of the adjacent high voltage units comprises a raised portion on a surface facing the higher strength portion of the other one of the adjacent high voltage units, the raised portion protruding toward the higher strength portion of the other one of the high voltage units, and the adjacent high voltage units are arranged such that a distance along the alignment axis between an outer end of the raised portion and the other one of the high voltage units or between the outer end of the raised portion and an outer end of a raised portion of the other one of the high voltage units is shorter than a distance between the lower strength portions along the alignment axis.

2. The electric vehicle according to claim 1, wherein each of the higher strength portions of the high voltage units is disposed at the lower side of the high voltage unit.

3. The electric vehicle according to claim 2, wherein the raised portion is a rib that protrudes from a surface of the casing of the higher strength portion of the one of the adjacent high voltage units, the surface faces the higher strength portion of the other one of the adjacent high voltage units, and the rib extends along a transverse or longitudinal axis of the one of the adjacent high voltage units.

4. The electric vehicle according to claim 3, wherein the raised portion is a portion of a coupling flange of the casing of the higher strength portion of the one of the adjacent high voltage units, the coupling flange is fixed to the lower strength portion of the one of the adjacent high voltage units, and the portion of the coupling flange faces the higher strength portion of the other one of the adjacent high voltage units.

5. The electric vehicle according to claim 2, wherein the raised portion is a portion of a coupling flange of the casing of the higher strength portion of the one of the adjacent high voltage units, the coupling flange is fixed to the lower strength portion of the one of the adjacent high voltage units, and the portion of the coupling flange faces the higher strength portion of the other one of the adjacent high voltage units.

6. The electric vehicle according to claim 1, wherein the raised portion is a rib that protrudes from a surface of the casing of the higher strength portion of the one of the adjacent high voltage units, the surface faces the higher strength portion of the other one of the adjacent high voltage units, and the rib extends along a transverse or longitudinal axis of the one of the adjacent high voltage units.

7. The electric vehicle according to claim 6, wherein the raised portion is a portion of a coupling flange of the casing of the higher strength portion of the one of the adjacent high voltage units, the coupling flange is fixed to the lower strength portion of the one of the adjacent high voltage units, and the portion of the coupling flange faces the higher strength portion of the other one of the adjacent high voltage units.

8. The electric vehicle according to claim 1, wherein the raised portion is a portion of a coupling flange of the casing of the higher strength portion of the one of the adjacent high voltage units, the coupling flange is fixed to the lower strength portion of the one of the adjacent high voltage units, and the portion of the coupling flange faces the higher strength portion of the other one of the adjacent high voltage units.

9. The electric vehicle according to claim 1, wherein the plurality of high voltage units comprise a fuel cell unit and a power control unit that controls electric power supplied from the fuel cell unit to a vehicle driving motor that is powered by the electric power supplied from the fuel cell unit.

10. An electric vehicle comprising:
a plurality of high voltage units disposed next to each other in a front compartment, when viewed from above the electric vehicle, each of the plurality of high voltage units comprising
  a lower strength portion disposed at either one of an upper side and a lower side of the high voltage unit, and
  a higher strength portion disposed at the other one of the upper side and the lower side of the high voltage unit, the higher strength portion having a strength higher than that of the lower strength portion,
wherein the plurality of high voltage units are arranged such that a distance between the higher strength portions of the adjacent high voltage units along an alignment axis along which the adjacent high voltage units are disposed next to each other is shorter than a distance between the lower strength portions of the adjacent high voltage units along the alignment axis,
the plurality of high voltage units comprises a fuel cell unit and a power control unit that controls electric power supplied from the fuel cell unit to a vehicle driving motor that is powered by the electric power supplied from the fuel cell unit, and
the fuel cell unit and the power control unit are disposed next to each other along a traverse axis of the electric vehicle in the front compartment when viewed from above the electric vehicle.

* * * * *